United States Patent
Erben et al.

(10) Patent No.: US 7,400,809 B2
(45) Date of Patent: Jul. 15, 2008

(54) OPTICAL WAVEGUIDE DEVICES AND METHOD OF MAKING THE SAME

(75) Inventors: Christoph Georg Erben, Clifton Park, NY (US); Thomas Bert Gorczyca, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/009,143

(22) Filed: Dec. 10, 2004

(65) Prior Publication Data

US 2006/0127021 A1   Jun. 15, 2006

(51) Int. Cl.
*G02B 6/10* (2006.01)
*G02B 6/00* (2006.01)

(52) U.S. Cl. .................. 385/129; 264/1.24
(58) Field of Classification Search .......... 385/123, 385/124, 129–132
See application file for complete search history.

(56) References Cited

U.S. PATENT DOCUMENTS

| | | | |
|---|---|---|---|
| 3,955,015 A | 5/1976 | Ohtsuka et al. | |
| 5,402,514 A | 3/1995 | Booth et al. | |
| 5,940,568 A * | 8/1999 | Losch | 385/129 |
| 6,093,448 A | 7/2000 | LaFleur et al. | |
| 2001/0031122 A1 | 10/2001 | Lackritz et al. | |
| 2002/0191931 A1* | 12/2002 | Ferm et al. | 385/129 |
| 2003/0012493 A1 | 1/2003 | Lee et al. | |
| 2003/0055120 A1 | 3/2003 | Blomquist | |
| 2004/0101268 A1 | 5/2004 | Shih et al. | |
| 2007/0148566 A1* | 6/2007 | Choki et al. | 430/14 |

FOREIGN PATENT DOCUMENTS

| | | |
|---|---|---|
| EP | 0412675 | 2/1991 |
| EP | 0835744 | 4/1998 |
| GB | 2191603 | 12/1987 |
| JP | 04165310 | 6/1992 |
| JP | 2004-021220 | * 1/2004 |
| WO | WO02/088795 | 11/2002 |
| WO | WO03/058292 | 7/2003 |

* cited by examiner

*Primary Examiner*—Charlie Peng
(74) *Attorney, Agent, or Firm*—Fletcher Yoder

(57) ABSTRACT

An optical device structure includes a first cladding having a first refractive index, a second cladding having a second refractive index, a core disposed between the first and second claddings, wherein the core has a third refractive index, and wherein the first and second refractive indices are relatively lower than the third refractive index, and a diffusion region disposed between the core and one of the first cladding, the second cladding, or both. A method for making the aforementioned optical device structure is provided.

38 Claims, 5 Drawing Sheets

OPTICAL WAVEGUIDE DEVICES AND METHOD OF MAKING THE SAME

BACKGROUND

The invention relates generally to optical device structures. In particular, the invention relates to an optical waveguide and a method of making the same.

Optical waveguides or holograms are used for optical communication or information recording. In any type of optical communication system there is the need for interconnecting different discrete components. These components may include a range of devices, such as lasers, detectors, fibers, modulators, and switches. Polymer-based devices, such as waveguides, offer a viable way of interconnecting these components, and offer a potentially inexpensive interconnection scheme.

An optical waveguide provides an optical transmission path in which light propagates in a high refractive index medium surrounded with a low refractive index medium by undergoing a total reflection at its boundary surface. Here, the total reflection is the phenomenon in which, when the incident angle of light entering from a transparent high refractive index medium to a low refractive index medium is smaller than a certain angle, all the energy of the light is reflected at its boundary surface without loss. Holograms are interference fringes produced by exposing a photosensitive material to two light beams having high coherence. Holograms may be used in many applications, such as information recording media, reflecting plates, optical filters, and grating waveguides, by using the diffraction phenomenon of the interference fringe.

The most frequently used material for such a waveguide device is glass, which is formed into a fiber of specified dimensions. Other materials for producing the above mentioned waveguides and holograms include polymers, quartzes, heavy metal oxides, and liquid crystals. Usually, when a waveguide is produced by using a polymer as a raw material a pattern is formed by means of standard photolithographic techniques. Standard lithographic processes are used to define a pattern in a photoresist layer deposited on a chosen substrate. Then an etchant is applied onto the photoresist layer to etch the defined pattern. The photoresist pattern is then etched away using a solvent. This process however is, time consuming, laborious and costly. For these reasons, the production of a homogeneous large-area waveguides is difficult.

Accordingly, a need exists for a relatively fast, precise and low cost technique for making optical device structures, such as waveguides, and holograms.

BRIEF DESCRIPTION

In accordance with one aspect of the present technique, a method for making an optical device structure is provided. The method comprises disposing a blend having a polymerizable monomer between a first cladding having a first refractive index and a second cladding having a second refractive index to form a layered structure. The layered structure includes a core having a third refractive index. The first and second refractive indices are lower than the third refractive index. Further, the method comprises forming a pattern in the layered structure to define a waveguide area and a surrounding area in the layered structure, irradiating the waveguide area of the layered structure with a patterning radiation, and processing the layered structure to form the optical device structure.

In accordance with another aspect of the present technique, a method for making an optical device structure includes forming a pattern in the layered structure to define a waveguide area and a surrounding area in the layered structure, and forming a diffusion region between the core and one of the first cladding, the second cladding, or both. The waveguide area of the layered structure is irradiated with a patterning radiation to form a path for light in the core, and the layered structure is processed to form the optical device structure.

In accordance with yet another aspect of the present technique, a method for making an optical device structure includes forming a diffusion region between the core and one of the first cladding, the second cladding, or both via migration of the polymerizable monomer from the core into the portion of one of the first cladding, the second cladding, or both to form a gradient in refractive index between the core and one of the first cladding, the second cladding, or both. The waveguide area of the layered structure is again irradiated with a patterning radiation to form a path for light in the core, and the layered structure is processed to form the optical device structure.

In accordance with still another aspect of the present technique, an optical device structure is provided. The optical device structure comprises a first cladding having a first refractive index, a second cladding having a second refractive index, a core disposed between the first and second claddings. The core has a third refractive index. The first and second refractive indices are relatively lower than the third refractive index. A diffusion region is disposed between the core and one of the first cladding, the second cladding, or both.

In accordance with another aspect of the present technique, an optical device structure comprises a first cladding having a first refractive index, a second cladding having a second refractive index, a core disposed between the first and second claddings. The core has a third refractive index. Again, the first and second refractive indices are relatively lower than the third refractive index. A diffusion region is disposed between the core and one of the first cladding, the second cladding, or both. The diffusion region comprises a portion of one of the first cladding, the second cladding, or both having varying concentrations of the polymerizable monomer. The polymerizable monomer is migrated from the core and is polymerized in a portion of one of the first cladding, the second cladding, or both.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
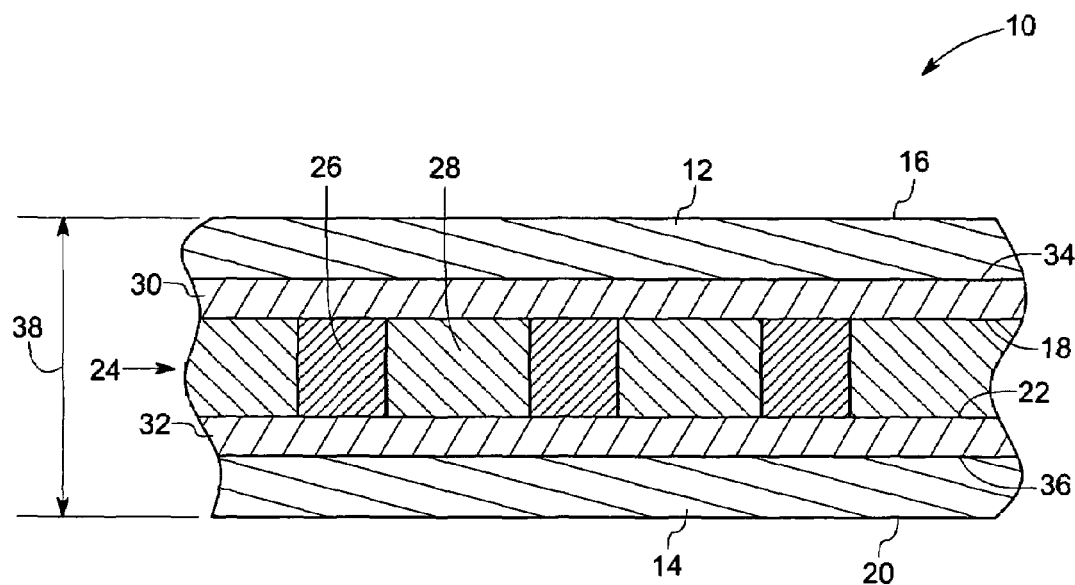
FIG. 1 is a diagrammatical representation of an exemplary optical device structure according to one aspect of the present technique.

FIG. 1 illustrates an exemplary optical device structure 10 of the present technique, wherein the optical device structure 10 may include a waveguide, a hologram, or the like. The illustrated structure 10 includes a first cladding 12 having a first refractive index and a second cladding 14 having a second refractive index. The refractive index of a medium is defined as the speed of light in the medium divided by the speed of light in a vacuum. The difference in refractive index between materials provides measurement of the amount a propagating light wave will refract or bend upon passing from one material to another in which the velocity of the propagating light wave is different. In one embodiment, the first refractive index is in a range from about 1.5 to about 1.6. In another embodiment, the second refractive index is also in a range from about 1.5 to about 1.6.

In the illustrated embodiment, the first cladding 12 has an outer surface 16 and an inner surface 18. Similarly, the second cladding 14 has an outer surface 20 and an inner surface 22. In certain embodiments, one of the first cladding 12, the second cladding 14 or both are made of a polymer, such as a thermoplastic, a polycarbonate, or the like. In some embodiments, the first and second claddings 12 and 14 are made of similar polymeric materials. In some embodiments, the first cladding, and the second cladding are substantially optically transmissive at the wavelengths for which they are intended, particularly for polymerizing the monomers within the structure as described below.

Further, the optical device structure 10 includes a core 24 disposed between the inner surfaces 18 and 22 of the first and second claddings. The core 24 may be made of at least one polymerizable monomer, such as, an acrylic monomer, a sulphone monomer, a cyanate monomer, an epoxy monomer, a vinyl monomer, or combinations thereof. Further, the core 24 comprises a third refractive index that is different from the first and second refractive indices. As described in detail below, the core 24 is a patterned part of the optical device structure 10 having waveguide areas 26 and surrounding areas 28. The waveguide areas 26 of the core are used to guide light from one point of the core 24 to another. Whereas, the first and second claddings serve to confine any propagating light to the core 24, thereby avoiding loss of energy or information into the surrounding space. For this reason, the first and second refractive indices are relatively lower than the third refractive index. In one embodiment, the third refractive index is in a range from about 1.5 to about 1.7.

In the illustrated embodiment, the optical device structure 10 includes diffusion regions 30 and 32 disposed or formed between the core 24 and one of the first cladding 12, second cladding 14, or both. In particular, the diffusion region 30 is disposed between the inner surface 18 of the first cladding 12 and an interface 34 between the first cladding 12 and the diffusion region 30. Similarly, the diffusion region 32 is disposed between the inner surface 22 of the second cladding 14 and an interface 36 between the second cladding 14 and the diffusion region 32. In certain embodiments the diffusion region may comprise a portion of one of the first cladding 12, second cladding 14, or both having varying concentrations of the polymerizable monomer of the core 24. As described in detail below, the diffusion region is formed due to migration followed by polymerization of the at least one monomer from the core 24 in the portion of one of the first cladding 12, second cladding 14, or both upon irradiation. Depending on the amount of migrated monomer from the core 24 into the cladding at various positions in the diffusion region, the diffusion region may comprise a gradient in refractive index between the core and one of the first cladding 12, second cladding 14, or both. Further, the optical device structure 10 may include a predetermined thickness 38, where the predetermined thickness 38 is in a range from about 30 microns to about 1000 microns. In an alternate embodiment, the predetermined thickness 38 of the device structure 10 is in a range from about 300 microns to about 500 microns.

Figure 2:
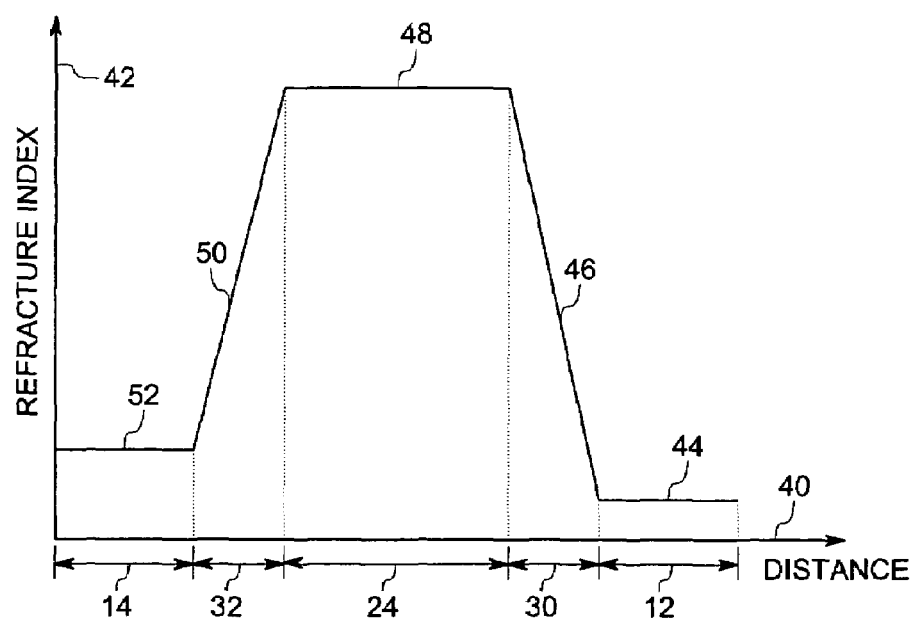
FIG. 2 is a graphical representation of the variation in refractive index in the optical device structure according to one aspect of the present technique.

FIG. 2 illustrates a variation in the refractive index along the thickness 38 of the optical device structure 10. Ordinate axis 40 represents the distance along the thickness 38 and the abscissa axis 42 represents the refractive index values corresponding to various portions of the optical device structure 10. The flat portion of the curve represented by the reference numeral 44 represents the refractive index value of the first cladding 12. The portion 46 represents the variation in the refractive index value of the diffusion region 30 while traversing from the cladding into the core. The flat portion 48 represents the refractive index value of the core 24. Alternatively, the refractive index in the core 24, represented by the reference numeral 48 may possess one or more gradients. In other words, the portion 48 may be linear with an upward or downward gradient or may be curved. Further, the variation in the refractive index value in the portion 50 corresponds to the portion of the device between the core 24 and the diffusion region 32. Lastly, the portion 52 represents the refractive index value of the second cladding 14.

Figure 3:
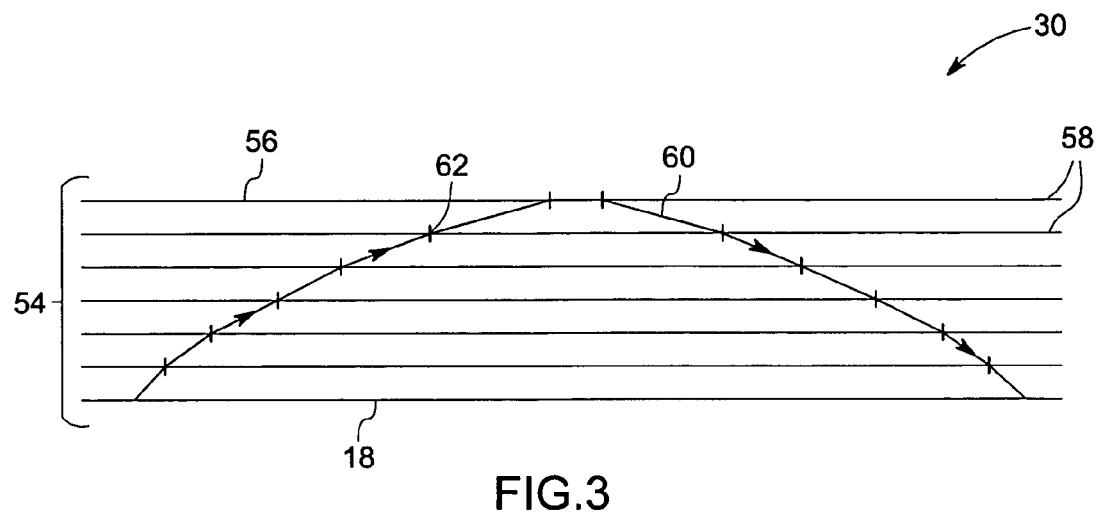
FIG. 3 is a diagrammatic representation of an exemplary portion of the diffusion region of the optical device structure according to one aspect of the present technique.

FIG. 3 represents an enlarged view of a portion 54 of the diffusion region 30 disposed between the inner surface 18 of the first cladding 12 and an intermediate position 56 in the diffusion region 30. As mentioned earlier, the diffusion region has varying refractive index along its thickness. In the depicted embodiment, for the purpose of illustration, the different sections of the diffusion region having varying refractive indices are separated by horizontal lines 58. As will be appreciated by those skilled in the art, light changes its path while traversing between regions having varying refractive indices. Accordingly, a gradual shift of refractive index in the diffusion region results in change of path of the light as it traverses the diffusion region. Advantageously, light entering the diffusion region that is bound outwards from the core may change its path and return to the core due to varying refractive indices in the diffusion region. As a result, loss of light through the cladding may be reduced. In the depicted embodiment, the path traversed by light in the portion 54 is represented by reference numeral 60, the direction of light changes at each junction 62 between any two regions having dissimilar refractive indices. Here it should be noted that the density of the cladding material is generally lower than that of the core. This difference in density, in the example of the materials chosen for the current embodiment, reflects the fact that refractive index of the material is proportional to its density.

Figure 4:
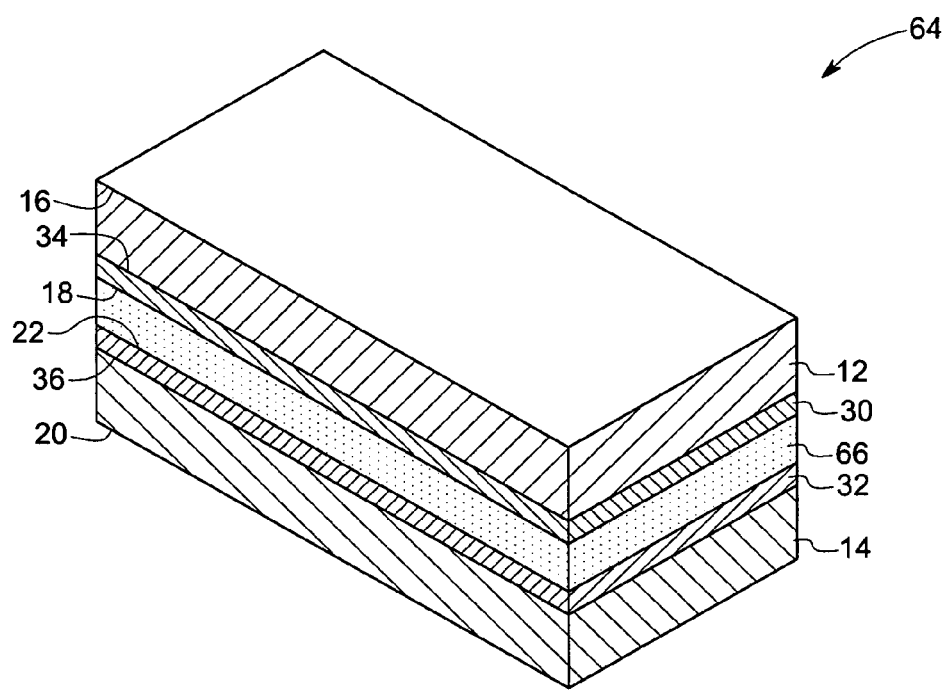
FIG. 4 is a perspective view of an exemplary layered structure of the optical device structure according to certain embodiments of the present technique.

In one aspect of the present technique, a method is provided for making the optical device structure 10. FIG. 4 represents a physical arrangement of a layered structure 64 having a blend 66 comprising the polymerizable monomer disposed between the first cladding and the second cladding such that the inner surfaces 18 and 22 of the first and second claddings are in contact with the blend. Typically, the blend is disposed between the first cladding 12 and the second cladding 14 through techniques, such as, roll-coating, pressing, dip-coating, spray coating, spin-coating, and the like. In the depicted embodiment, the polymerizable monomer diffuses into one or both of the first and second claddings 12 and 14. As a result, a compositional change between the core and one of the first cladding 12, second cladding 14, or both takes place. Subsequently, diffusion regions 30 and 32 start to form between the blend 66 and the first and second claddings 12 and 14. As mentioned above, the diffusion regions 30 and 32 comprise a gradient in refractive index between the core and one of the first cladding, the second cladding, or both. In certain embodiments, the polymerizable monomer comprises an acrylic monomer, a sulphone monomer, a cyanate monomer, an epoxy monomer, a vinyl monomer, or combinations thereof. In some embodiments, the monomer may include brominated epoxy acrylate based on tetrabromobisphenol A and 2-phenylthio ethyl acrylate. In one embodiment, the blend 66 may further include an initiator, such as bis(2,4,6-trimethylbenzoyl)-phenyl phosphineoxide. Where included, the initiator present in the blend 66 is typically present in an amount sufficient to polymerize the polymerizable monomer. Other additives may also be added to the polymerizable monomer depending on the purpose and the end use of the resulting final materials. Examples of these include binder, antioxidants, chain transfer agents, photo-stabilizers, volume expanders, free radical scavengers, ultraviolet (UV) absorbers, contrast enhancers.

Figure 5:
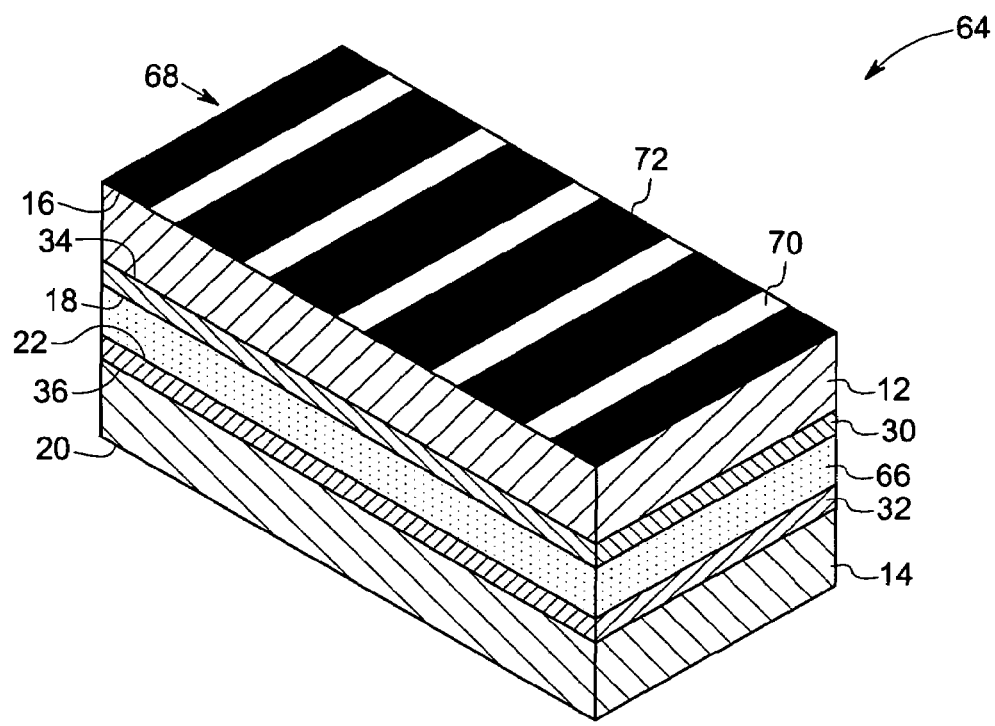
FIG. 5 is a perspective view of an exemplary mask disposed on the layered structure of FIG. 4 according to certain embodiments of the present technique.

In certain embodiments, the layered structure 64 may be subjected to a pressure to facilitate adherence of the blend to the first and second claddings, or to provide the predetermined thickness 38 to the layered structure 64. Next, a pattern is formed in the layered structure to define waveguide areas 26 and surrounding areas 28 (refer to FIG. 1 above). In certain embodiments, the pattern is formed by using a mask 68 that creates regions corresponding to the waveguide areas 26 and the surrounding areas 28 depending upon the coverage of the mask on the surface. For example, as shown in FIG. 5 the mask 68 is disposed on the outer surface 16 of the first cladding 12 to define exposed portions 70 which are directly above the waveguide areas 26 (see FIG. 1) of the core 24 and unexposed portions 72 of the layered structure. Though in the illustrated embodiment, the mask 68 has rectangular exposed portions 70 and unexposed portions 72, the mask 68 may have any other desired pattern. As will be understood by those skilled in the art, rather than a mask, other techniques may be used to form the structures described herein, such as a direct write laser controlled to define waveguide and surrounding areas 26 and 28 in the core 24. Also, the mask 68 may not be in physical contact with the layered structure 64. In the illustrated embodiment, the exposed portions 70 of the upper cladding 12 are located directly above the waveguide areas 26 of the core 24. Similarly, the unexposed portions 72 of the upper cladding 12 are located directly above the surrounding areas 28 of the core 24. Although not shown, alternatively, the unexposed portions 72 of the upper cladding 12 may be located directly above the waveguide areas 26. Similarly, the exposed portions 70 of the upper cladding 12 may be located directly above the surrounding areas 28 of the core 24. In other words, the portion of the blend exposed to the irradiation 74 may form the surrounding areas 28 and the portion of the blend unexposed to the irradiation may polymerize to form the waveguide areas 26, depending upon the polymerizable monomer employed.

Figure 6:
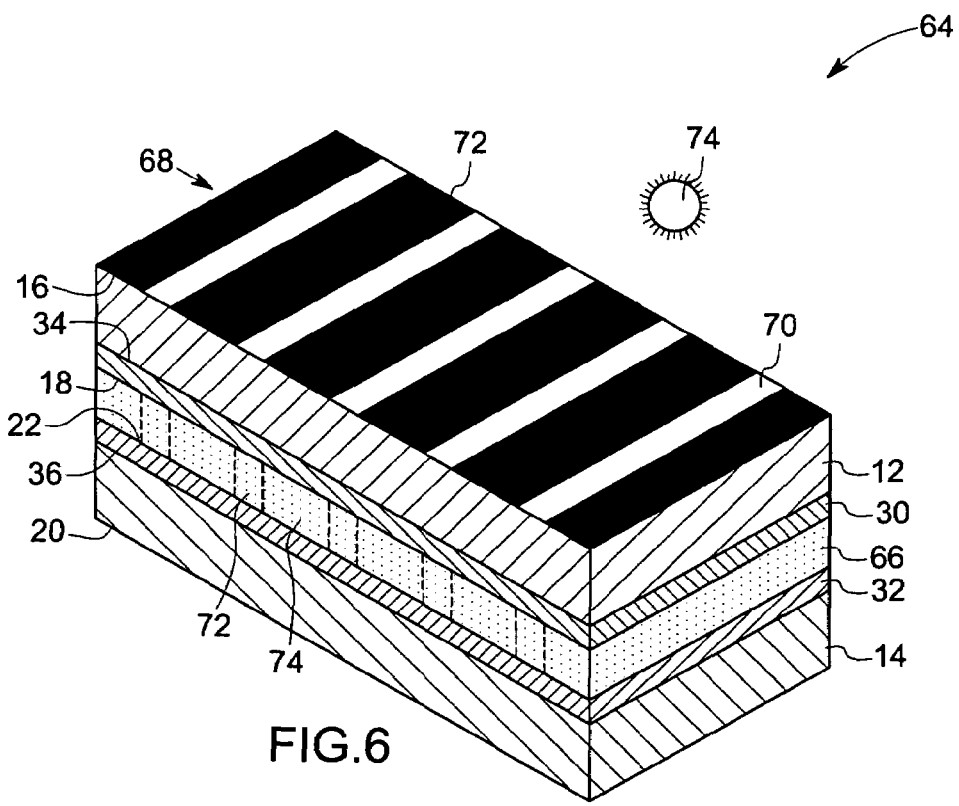
FIG. 6 is a perspective view of the layered structure of FIG. 5 irradiated by a patterning radiation according to certain embodiments of the present technique.

FIG. 6 illustrates the irradiation step employed to form a pattern in the core 24. The step of irradiating results in polymerization of the polymerizable monomer. The polymerization results in increase in the density of the waveguide areas 26. As a result, monomer from the surrounding areas 28 diffuses into the waveguide area 26 and into the one or both of the first and second claddings 12 and 14. In the illustrated embodiment, the layered structure 64 is irradiated with a patterning radiation 74, where the pattern forms waveguide areas 26 (see FIG. 1) in the portion represented by reference numeral 76 and the surrounding areas 28 (see FIG. 1) in the portion represented by reference numeral 78. In some embodiments, the patterning radiation is in a wavelength range from about 200 nm to about 500 nm. In one embodiment, the radiation is an UV radiation.

Figure 7:
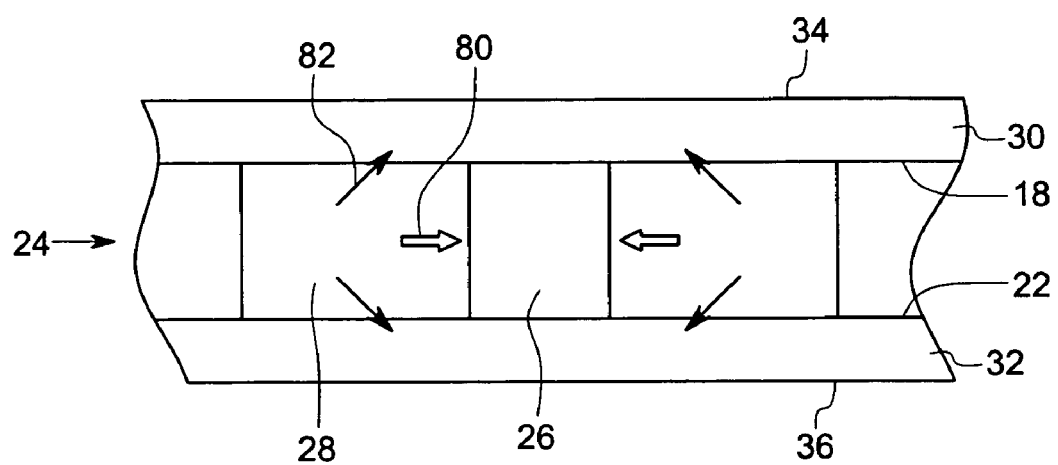
FIG. 7 is a diagrammatical representation of diffusion of monomers from the surrounding area of the core into the waveguide area of the core and first and second claddings according to one aspect of the present technique.

As discussed above, irradiation of the blend results in waveguide areas 26 having dissimilar refractive indices than surrounding areas 28. Upon irradiation some of at least one of the polymerizable monomer of the waveguide area 26 starts to polymerize. Polymerization leads to decrease in the monomer concentration in the waveguide areas 26. As a result, the monomer from the adjacent surrounding areas 28 diffuses into the waveguide area 26 as shown by arrows 80 in FIG. 7. This diffusion changes and typically increases the density of the waveguide area 26, thereby raising its refractive index. Additionally, some of the monomer from the surrounding area 28 begins to diffuse into one or both of the first and second claddings 12 and 14 as shown by arrows 82, and polymerizes, thereby changing the composition of the surrounding areas 28 over its initial state. This diffusion of the monomer from the blend 66 into the cladding as shown by arrows 82 leads to formation of diffusion regions between the core and one or both of the first and second claddings 12 and 14.

Next, the layered structure 64 so formed is processed to stabilize the diffusion regions and the core 24. In one embodiment, the processing step facilitates diffusion of the polymerizable monomer from the surrounding areas 28 into the waveguide areas 26 and into the one or both of the first and second claddings 12 and 14. In some embodiments, the processing step comprises heating the layered structure 64 at a predetermined temperature for a period of time. In one embodiment, the predetermined temperature is in a range from about 50° C. to about 100° C. In another embodiment, the period of time is in a range from about 1 minute to about 1 hour.

Figure 8:
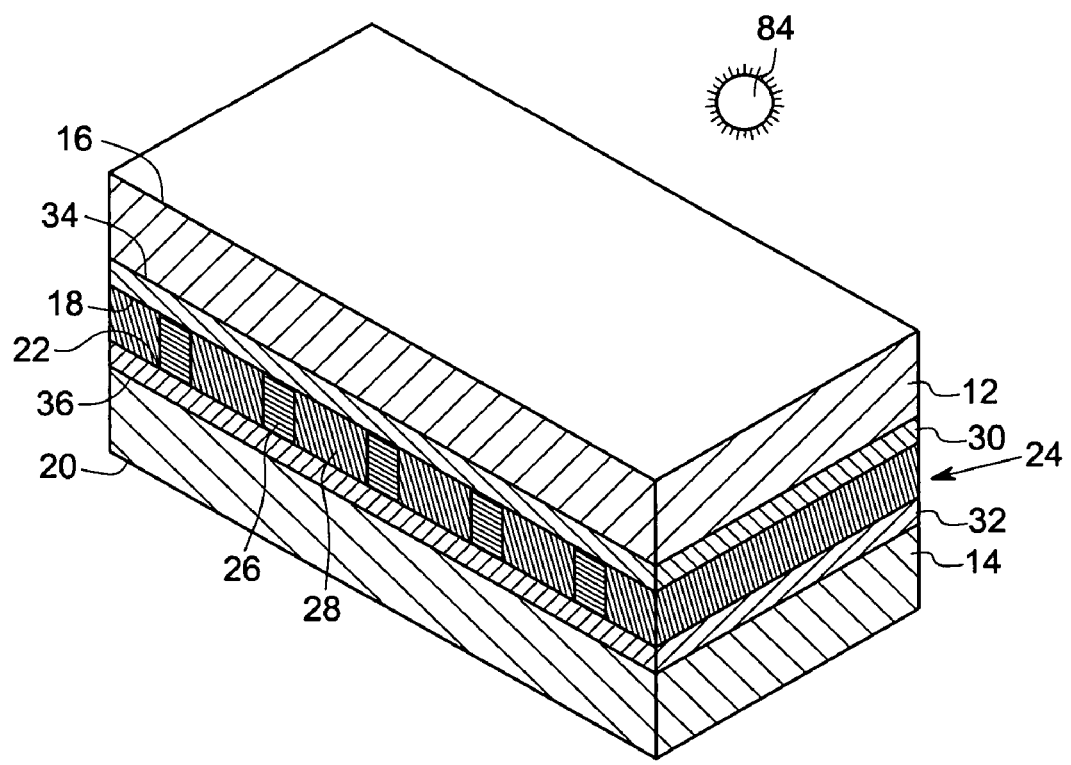
FIG. 8 is a perspective view of the layered structure of FIG. 6 irradiated by a curing radiation according to certain embodiments of the present technique.

In alternate embodiments, the processing step comprises exposing the layered structure having the predetermined pattern to a curing radiation 84 as shown in FIG. 8. In one embodiment, the layered structure is exposed to curing radiation in a wavelength range from about 250 nm to about 500 nm for a curing time of about 1 second to about 10 minutes.

Figure 9:
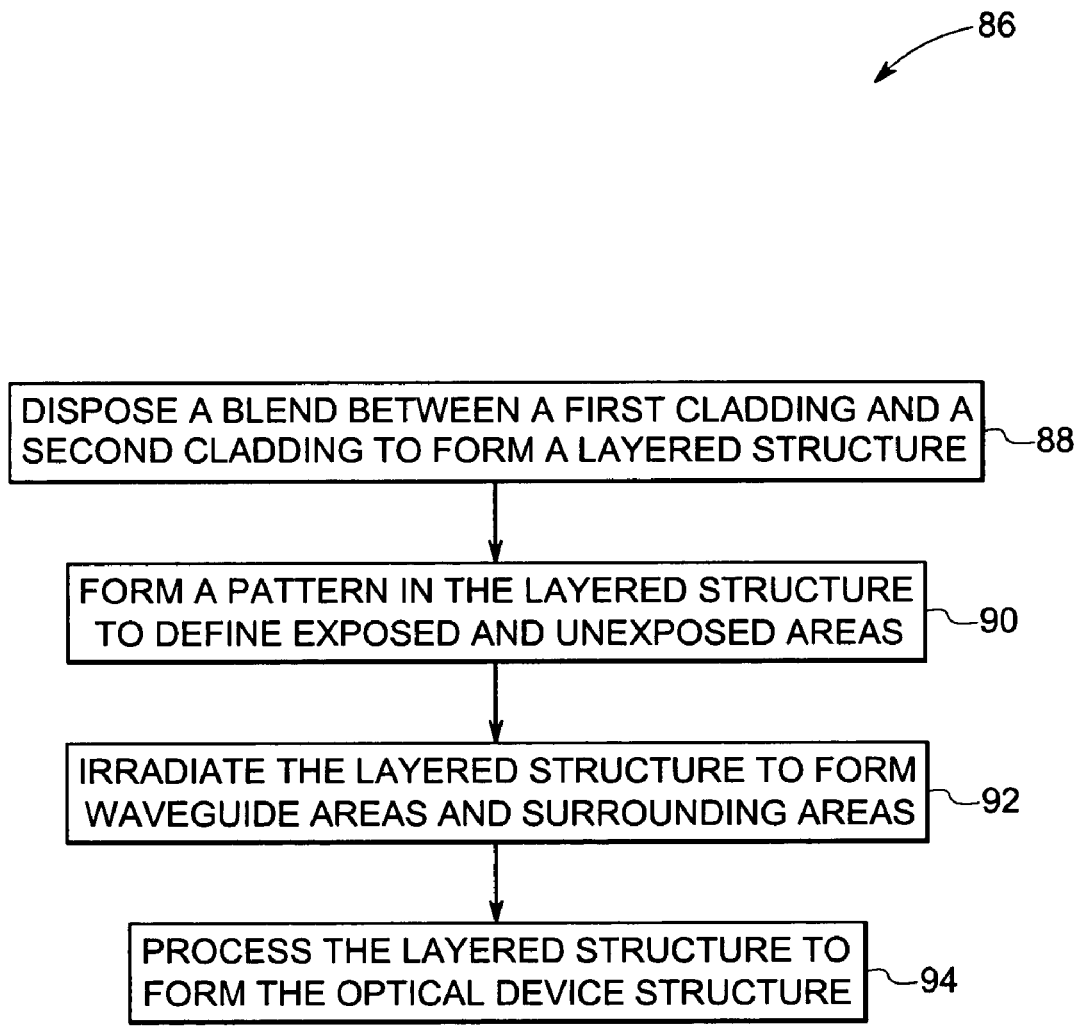
FIG. 9 is a flow chart illustrating a method for making an optical device structure according to certain aspects of the present technique.

Referring to FIG. 9, a method for making an optical device structure 10 of FIG. 1 is illustrated and represented generally by reference numeral 86. Initially, a blend 66 is disposed between first and second claddings 12 and 14 to form a layered structure 64, as represented by block 88 (see FIG. 4). Next, a pattern is formed in the layered structure 64 (see FIG. 5) to define a waveguide area 26 and a surrounding area 28, as represented by block 90 (see FIG. 6). The waveguide area 26 of the layered structure 64 is then irradiated with a patterning radiation 74, as represented by block 92 (see FIG. 6). The layered structure 64 is then processed to form an optical device structure 10, as represented by block 94 (see FIG. 8).

The methods described above may be used to define optical device structures, such as waveguides, holograms or any other article of manufacture employing the optical device structure 10. Advantageously, the method allows the use of roll-to-roll process for production of these optical device structures. Thus saving time and increasing efficiency of the manufacturing process.

The following examples illustrate the features of the invention, and are not intended to limit the invention in any way.

EXAMPLE 1

40 g 2-phenylthio ethyl acrylate (PTEA) (BX-PTEA) obtained from BIMAX (Cockeysville, Md.), 60 g brominated epoxy acrylate based on tetrabromobisphenol A (BrBPA-EA) (RDX 51027) obtained from UCB Chemicals (Smyrna, Ga.) and 0.5 g Irgacure 819 obtained from Ciba Speciality Chemicals Corporation (Tarrytown, N.Y.) was mixed to form a blend. The blend was then filtered through a 0.2 micron filter.

A polycarbonate sheet (LEXAN® T2FOQ™ FILM) obtained from General Electric (Niskayuna, N.Y.), and having dimensions of 5 inch by 5 inch and thickness 175 microns was cleaned. 0.7 g of the blend was then disposed substantially on the center of the polycarbonate sheet. A second polycarbonate sheet (LEXAN® T2FOQ™ FILM) obtained from General Electric (Niskayuna, N.Y.) having the same dimensions was then disposed on the blend to form a layered structure, while avoiding bubble formation in the blend. Subsequently, a pressure of 15 psi was applied using a vacuum press. A contact mask made of glass was disposed on the layered structure and exposed to broadband UV irradiation from an unfiltered mercury arc lamp, with primary emissions in a wavelength range from about 350 nm to about 450 nm for 60 seconds. Next, the layered structure was baked on a hot plate at a temperature of 60° C. for 5 minutes. The layered structure was then exposed to UV broadband radiation from an unfiltered mercury lamp, with primary emissions in a wavelength range from about 350 nm to 450 nm for 2 minutes.

EXAMPLE 2

A blend having 40 g 2-[(phenylsulfanyl) methyl] oxirane is prepared from epichlorohydrin and thiophenol both obatined from Aldrich Chemicals (Milwaukee, Wis.), 60 g tetrabromobisphenol A glycidyl ether (BrBPA-EA) (RDX 5102) obtained from UCB Chemicals (Smyrna, Ga.) and 0.5 g of a photo acid generator, arylsulfonium hexafluoroantimonate (UVI-6976) obtained from Dow Chemical Company (Midland, Mich.) is made. The blend is filtered using a 0.2 microns glass filter.

A polycarbonate sheet (LEXAN® T2FOQ™ FILM) obtained from General Electric (Niskayuna, N.Y.), and having dimensions of 5 inch by 5 inch and thickness 175 microns is cleaned and 0.7 g of the blend is disposed on the polycarbonate sheet. A second polycarbonate sheet is then disposed on the blend to form a layered structure, while avoiding bubble formation in the blend. Subsequently, a pressure of 15 psi is applied using a vacuum press. A contact mask made of glass is then disposed on the layered structure. The layered structure with the mask is then exposed to broadband UV irradiation from an unfiltered mercury lamp, with primary emission in a wavelength range from 350 nm to 450 nm for 60 seconds. Next, the layered structure is baked on a hot plate at a temperature of 60° C. for 5 minutes. The layered structure is then exposed to UV broadband radiation from an unfiltered mercury arc lamp with primary emissions in a wavelength range from 350 nm to 450 nm for 2 minutes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for making an optical device structure, the method comprising:

disposing a blend between a first cladding having a first refractive index and a second cladding having a second refractive index to form a layered structure comprising the first cladding, the second cladding and a core having a third refractive index, wherein the blend comprises a polymerizable monomer, and wherein the first and second refractive indices are lower than the third refractive index;

masking the layered structure with a pattern to define a waveguide area and a surrounding area;

irradiating the layered structure via the pattern with radiation to create the waveguide area and the surrounding area in the core, wherein the step of irradiating promotes polymerization of the polymerizable monomer; and processing the layered structure to form the optical device structure, wherein the optical device structure comprises:

a first diffusion region disposed between the core and the first cladding; and a second diffusion region disposed between the core and the second cladding, wherein the first and second diffusion regions are disposed on opposite top and bottom sides of the core.

2. The method of claim 1, wherein the optical device structure comprises a diffusion region, wherein the diffusion region comprises a gradient in refractive index between the core and one of the first cladding, the second cladding, or both.

3. The method of claim 1, wherein the polymerizable monomer comprises an acrylic monomer, a sulphone monomer, a cyanate monomer, an epoxy monomer, a vinyl monomer, or combinations thereof.

4. The method of claim 1, wherein the blend further comprises an initiator, wherein the initiator comprises bis(2,4,6-trimethylbenzoyl)-phenyl phosphineoxide.

5. The method of claim 1, wherein the layered structure comprises a predetermined thickness, wherein the predetermined thickness is in a range from about 30 microns to about 1000 microns.

6. The method of claim 5, wherein the predetermined thickness is in a range from about 300 microns to about 500 microns.

7. The method of claim 1, wherein wavelength of the patterning radiation is in a wavelength range from about 200 nm to about 500 nm.

8. The method of claim 1, wherein the processing step comprises heating the layered structure having the predetermined pattern at a predetermined temperature for a period of time.

9. The method of claim 1, wherein the processing step comprises exposing the layered structure having the predetermined pattern to a curing radiation.

10. A method for making an optical device structure, the method comprising:

disposing a blend between a first cladding having a first refractive index and a second cladding having a second refractive index to form a layered structure comprising a core disposed between the first and second claddings and having a third refractive index, wherein the first and second claddings are disposed on opposite top and bottom sides of the core, wherein the blend comprises a polymerizable monomer, and wherein the first and second refractive indices are lower than the third refractive index;

masking the layered structure with a pattern to define a path for light;

forming a first diffusion regions between the core and the first cladding;

forming a second diffusion region between the core and the second cladding, wherein the first and second diffusion regions are disposed on the opposite top and bottom sides of the core;

irradiating the layered structure with a patterning radiation to form a path for light in the core; and processing the layered structure to form the optical device structure.

11. The method of claim 10, wherein irradiating the layered structure comprises disposing a mask on the layered structure that creates regions corresponding to a waveguide area and a surrounding area.

12. The method of claim 10, wherein the step of irradiating promotes polymerization of the polymerizable monomer.

13. The method of claim 10, wherein the first and second diffusion regions comprise respective first and second gradients in refractive index between the core and the respective first and second claddings.

14. A method for making an optical device structure, the method comprising:

disposing a blend between a first cladding having a first refractive index and a second cladding having a second refractive index to form a layered structure comprising the first and second claddings and a core having a third refractive index, wherein the blend comprises a polymerizable monomer, and wherein the first and second refractive indices are lower than the third refractive index;

masking the layered structure with a pattern to define a path for light;

forming a first gradients in refractive index between the core and the first cladding;

forming a second gradient in refractive index between the core and the second cladding, wherein the first and second gradients are disposed on opposite top and bottom sides of the core; and irradiating the waveguide area of the layered structure with a patterning radiation to form a path for light in the core, wherein the step of irradiating promotes polymerization of the polymerizable monomer.

15. The method of claim 14, wherein irradiating comprises creating a first diffusion region and a second diffusion region in the first and second claddings, respectively, to form the first and second gradients, respectively.

16. The method of claim 14, wherein the polymerizable monomer comprises an acrylic monomer, a sulphone monomer, a cyanate monomer, an epoxy monomer, a vinyl monomer, a brominated epoxy acrylate based on tetrabromobisphenol A and 2-phenylthio ethyl acrylate, or combinations thereof.

17. The method of claim 14, wherein the blend further comprises an initiator.

18. The method of claim 17, wherein the initiator comprises bis(2,4,6-trimethylbenzoyl)-phenyl phosphineoxide.

19. The method of claim 14, comprising heating the layered structure having the pattern at a predetermined temperature for a period of time.

20. An optical device structure comprising:
a first cladding having a first refractive index;
a second cladding having a second refractive index;
a core disposed between the first and second claddings, wherein the core has a third refractive index, and wherein the first and second refractive indices are relatively lower than the third refractive index, wherein the first and second claddings are disposed on opposite top and bottom sides of the core, and wherein the core comprises a pattern having a waveguide area and a surrounding area;
a first diffusion region disposed between the core and the first cladding; and
a second diffusion region disposed between the core and the second cladding, wherein the first and second diffusion regions are disposed on the opposite top and bottom sides of the core.

21. The optical device structure of claim 20, wherein one of the first cladding, the second cladding, or both comprises a polycarbonate.

22. The optical device structure of claim 20, wherein the first and second claddings comprise similar polymer.

23. The optical device structure of claim 20, wherein the first diffusion region comprises a portion of the first cladding, and the second diffusion region comprises a portion of the second cladding, both the first and second diffusion regions having varying concentrations of a polymerizable monomer, wherein the polymerizable monomer is migrated from the core and is polymerized in respective portions of the first cladding and the second cladding.

24. The optical device structure of claim 20, wherein the polymerizable monomer comprises an acrylic monomer, a sulphone monomer, a cyanate monomer, an epoxy monomer, a vinyl monomer, or combinations thereof.

25. The optical device structure of claim 24 wherein the polymerizable monomer comprises brominated epoxy acrylate based on tetrabromobisphenol A and 2-phenylthio ethyl acrylate.

26. The optical device structure of claim 20, wherein the first and second claddings are generally planar.

27. The optical device structure of claim 26, wherein the first and second claddings have an outer surface without a pattern.

28. The optical device structure of claim 20, wherein the first and second claddings are disposed only on the opposite top and bottom sides of the core.

29. An optical device structure comprising:
a first cladding having a first refractive index;
a second cladding having a second refractive index;
a core disposed between the first and second claddings, wherein the core has a third refractive index, and wherein the first and second refractive indices are relatively lower than the third refractive index, and wherein the core comprises a pattern having a waveguide area and a surrounding area, wherein the first and second claddings are disposed on opposite top and bottom sides of the core; and
a first diffusion region and a second diffusion region disposed between the core and the first cladding and the second cladding, respectively, wherein the first and second diffusion regions comprise portions of the first cladding and the second cladding, respectively, having varying concentrations of a polymerizable monomer, wherein the polymerizable monomer is migrated from the core and is polymerized in respective portions of the first cladding and the second cladding, and wherein the first and second diffusion regions are disposed on the opposite top and bottom sides of the core.

30. The optical device structure of claim 29, wherein the first and second claddings are planar layers disposed only on the opposite top and bottom sides of the core.

31. A method for making an optical device structure, the method comprising:
   disposing a blend between a first cladding having a first refractive index and a second cladding having a second refractive index to form a layered structure comprising the first cladding, the second cladding and a core having a third refractive index, wherein the blend comprises a polymerizable monomer, and wherein the first and second refractive indices are lower than the third refractive index;
   masking the layered structure with a pattern to define a waveguide area and a surrounding area;
   irradiating the layered structure via the pattern with radiation to create the waveguide area and the surrounding area in the core; and
   wherein the optical device structure comprises a first gradient in refractive index between the core and the first cladding, a second gradient in refractive index between the core and the second cladding, and the first and second gradients are disposed on opposite top and bottom sides of the core.

32. A method for making an optical device structure, the method comprising:
   disposing a blend between a first cladding having a first refractive index and a second cladding having a second refractive index to form a layered structure comprising the first cladding, the second cladding and a core having a third refractive index, wherein the blend comprises a polymerizable monomer, wherein the polymerizable monomer comprises an acrylic monomer, a sulphone monomer, a cyanate monomer, an epoxy monomer, a vinyl monomer, or combinations thereof, and wherein the first and second refractive indices are lower than the third refractive index;
   masking the layered structure with a pattern to define a waveguide area and a surrounding area;
   irradiating the layered structure via the pattern with radiation to create the waveguide area and the surrounding area in the core; and
   wherein the optical device structure comprises:
   a first diffusion region disposed between the core and the first cladding; and
   a second diffusion region disposed between the core and the second cladding, wherein the first and second diffusion regions are disposed on opposite top and bottom sides of the core.

33. The method of claim 32, wherein the polymerizable monomer comprises brominated epoxy acrylate based on tetrabromobisphenol A and 2-phenylthio ethyl acrylate.

34. A method for making an optical device structure, the method comprising:
   disposing a blend between a first cladding having a first refractive index and a second cladding having a second refractive index to form a layered structure comprising the first cladding, the second cladding and a core having a third refractive index, wherein the blend comprises a polymerizable monomer, wherein the blend further comprises an initiator, wherein the initiator comprises bis(2,4,6-trimethylbenzoyl)-phenyl phosphineoxide, and wherein the first and second refractive indices are lower than the third refractive index;
   masking the layered structure with a pattern to define a waveguide area and a surrounding area;
   irradiating the layered structure via the pattern with radiation to create the waveguide area and the surrounding area in the core; and
   wherein the optical device structure comprises:
   a first diffusion region disposed between the core and the first cladding; and
   a second diffusion region disposed between the core and the second cladding, wherein the first and second diffusion regions are disposed on opposite top and bottom sides of the core.

35. A method for making an optical device structure, the method comprising:
   disposing a blend between a first cladding having a first refractive index and a second cladding having a second refractive index to form a layered structure comprising the first cladding, the second cladding and a core having a third refractive index, wherein the first and second refractive indices are lower than the third refractive index, and the core comprises a pattern having a waveguide area and a surrounding area;
   forming a first diffusion region between the core and the first cladding; and
   forming a second diffusion region between the core and the second cladding, wherein the first and second diffusion regions are disposed on opposite top and bottom sides of the core.

36. The method of claim 35, wherein the predetermined temperature is in a range from about 50° C. to about 100° C.

37. The method of claim 35, wherein the period of time is in a range from about 1 minute to about 1 hour.

38. A method for making an optical device structure, the method comprising:
   disposing a blend between a first cladding having a first refractive index and a second cladding having a second refractive index to form a layered structure comprising the first cladding, the second cladding and a core having a third refractive index,
   wherein the blend comprises a polymerizable monomer, the first and second refractive indices are lower than the third refractive index, and the core comprises a pattern having a waveguide area and a surrounding area;
   providing a first diffusion region between the core and the first cladding; and
   providing a second diffusion region between the core and the second cladding, wherein the first and second diffusion regions are disposed on opposite top and bottom sides of the core.

* * * * *

UNITED STATES PATENT AND TRADEMARK OFFICE
CERTIFICATE OF CORRECTION

PATENT NO. : 7,400,809 B2 Page 1 of 1
APPLICATION NO. : 11/009143
DATED : July 15, 2008
INVENTOR(S) : Erben et al.

It is certified that error appears in the above-identified patent and that said Letters Patent is hereby corrected as shown below:

In Column 7, Line 49, delete "(RDX 5102)" and insert -- (RDX 51027) --, therefor.

In Column 9, Line 13, in Claim 10, delete "regions" and insert -- region --, therefor.

In Column 9, Line 46, in Claim 14, delete "gradients" and insert -- gradient --, therefor.

Signed and Sealed this

Ninth Day of June, 2009

JOHN DOLL
*Acting Director of the United States Patent and Trademark Office*